US008696871B2

(12) United States Patent
Noe et al.

(10) Patent No.: US 8,696,871 B2
(45) Date of Patent: Apr. 15, 2014

(54) APPARATUS FOR REMOVING A CONTAMINANT FROM A SOLVENT SEPARATION PROCESS

(75) Inventors: Jason L. Noe, Mount Prospect, IL (US); Lawrence E. Sullivan, Mount Prospect, IL (US); Bruce R. Beadle, Kildeer, IL (US); Edward M. Casey, Mount Prospect, IL (US); Thomas J. Stoodt, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 990 days.

(21) Appl. No.: 12/782,753

(22) Filed: May 19, 2010

(65) Prior Publication Data
US 2010/0300830 A1 Dec. 2, 2010

Related U.S. Application Data

(60) Provisional application No. 61/183,311, filed on Jun. 2, 2009.

(51) Int. Cl.
*B01D 11/00* (2006.01)
*C10G 7/00* (2006.01)

(52) U.S. Cl.
USPC ........... 202/169; 202/170; 196/14.52; 196/98

(58) Field of Classification Search
USPC ......... 196/14.52, 98; 202/169, 170, 254, 270; 203/50, 51, 52, 53, 68, 69; 208/311, 208/313, 321, 356, 362; 585/833
See application file for complete search history.

(56) References Cited

U.S. PATENT DOCUMENTS

| | | | |
|---|---|---|---|
| 3,167,501 A * | 1/1965 | Woodle .................... | 208/313 |
| 3,642,614 A | 2/1972 | Van Tassell | |
| 3,763,037 A | 10/1973 | Thompson | |
| 4,053,369 A | 10/1977 | Cines | |
| 4,775,475 A | 10/1988 | Johnson | |
| 4,997,547 A * | 3/1991 | Emmrich et al. ............ | 208/313 |
| 5,073,669 A | 12/1991 | Forte | |
| 5,310,480 A | 5/1994 | Vidueira | |
| 5,399,244 A | 3/1995 | Gentry et al. | |
| 5,849,982 A | 12/1998 | Lee et al. | |
| 6,303,021 B2 | 10/2001 | Winter et al. | |
| 6,310,260 B1 * | 10/2001 | Argyropoulos et al. ...... | 568/454 |
| 6,416,670 B1 | 7/2002 | Cummings | |
| 6,781,026 B2 | 8/2004 | Lee | |
| 7,078,580 B2 | 7/2006 | Tian et al. | |
| 7,666,299 B2 | 2/2010 | Wu et al. | |
| 7,871,514 B2 * | 1/2011 | Lee et al. ....................... | 208/313 |
| 7,879,225 B2 * | 2/2011 | Lee et al. ....................... | 208/313 |
| 7,943,047 B2 * | 5/2011 | Maassen et al. ............. | 210/639 |
| 8,246,815 B2 * | 8/2012 | Wu et al. ....................... | 208/321 |
| 2004/0182750 A1 * | 9/2004 | Khanna et al. ................ | 208/326 |
| 2008/0251458 A1 * | 10/2008 | Maassen et al. ............. | 210/639 |

* cited by examiner

*Primary Examiner* — Nina Bhat
*Assistant Examiner* — Jonathan Miller
(74) *Attorney, Agent, or Firm* — Mark R Willis

(57) ABSTRACT

The invention is a process and apparatus for removing a contaminant from an aromatic selective solvent. A feed stream comprising an aromatic hydrocarbon and a non-aromatic hydrocarbon is contacted with the aromatic selective solvent in an extractive distillation zone to produce a raffinate stream comprising the non-aromatic hydrocarbon, and a rich solvent stream comprising the aromatic hydrocarbon and the solvent. The rich solvent stream is separated in a second distillation zone to produce an extract stream comprising the aromatic hydrocarbon, and a lean solvent stream comprising the contaminant and the aromatic selective solvent. At least a portion of the lean solvent stream is washed with a non-aromatic hydrocarbon to produce a clean solvent stream, at least a portion of which is passed to at least one of the extractive distillation zone and the second distillation zone.

1 Claim, 2 Drawing Sheets

US 8,696,871 B2

APPARATUS FOR REMOVING A CONTAMINANT FROM A SOLVENT SEPARATION PROCESS

FIELD OF THE INVENTION

This invention relates to apparatus and processes for separating aromatics from a mixture of hydrocarbon species via extractive distillation. More particularly, the invention relates to removing contaminants from the solvent used in such processes.

BACKGROUND OF THE INVENTION

Aromatic hydrocarbons, such as benzene, toluene, and xylene can be recovered from various hydrocarbon feed stocks including catalytic reformates, light by-products from various hydrocarbon process units such as xylene isomerization, by-product oil from the manufacture of coke, and hydrogenated pyrolysis gasolines that also contain non-aromatic hydrocarbons. Use of an aromatic selective solvent can facilitate the removal of the aromatic from non-aromatic hydrocarbons in, e.g., an extractive process. In some processes, the hydrocarbon feed stock can be contacted with an aromatic selective solvent, in an extractive distillation column (ED column), which may include the presence of water. The ED column produces a raffinate phase, including one or more non-aromatic hydrocarbons and water, if present, which can exit the overhead of the column. A rich solvent phase including the aromatic selective solvent, and one or more aromatics in the feed stock can exit the bottom of the ED column. The rich solvent phase is separated in a second distillation column, which may include the presence of water, to produce an extract overhead stream of the desired aromatic hydrocarbon components and a lean solvent stream that is depleted in aromatic hydrocarbons and is recycled to the ED column.

To meet purity and recovery requirements for the desired aromatic hydrocarbon products, it is important to obtain a good separation between the lightest aromatic and the heaviest non-aromatic hydrocarbons in the ED column. Ideally, the aromatic selective solvent retains all of the lightest feed aromatic, e.g. benzene, in the lower portion of the ED column while all of the heaviest non-aromatics are driven out of the upper portion of the ED column. Therefore, it can be more difficult to meet stringent purity and recovery requirements when the feed stream has a wider boiling range of mixed hydrocarbon species. It has also been recognized that various steps may be taken to remove contaminants in the rich solvent stream produced by the ED column. Otherwise, these contaminants, such as aromatics which are heavier than the desired aromatic products and non-aromatics which are not driven into the raffinate stream, can accumulate in the lean solvent stream produced in the second distillation column as the solvent is recycled in the process. Contaminants may be introduced to the solvent via mechanical leaks in the equipment which could introduce items such as heating mediums or lubricating oils. Contaminants can also be formed within the process such as by degradation of the aromatic selective solvent.

It is known to contact a portion of the lean solvent produced by the second column with a secondary aqueous solvent, e.g. water, with and without a portion of the non-aromatic raffinate stream, to produce a secondary aqueous solvent stream containing the aromatic selective solvent, which is further separated before being recycled to the ED column. See, for example, U.S. Pat. No. 3,642,614 and US 2009/0038991 A1. There remains a need in the art for improved apparatus and processes that enable the removal of contaminants from the lean aromatic selective solvent stream used in extractive distillation processes.

SUMMARY OF THE INVENTION

In an embodiment, the invention is an apparatus for removing a contaminant from a solvent separation process comprising an extractive distillation zone, a second distillation zone, and a lean solvent washing zone. A feed conduit and a solvent conduit provide fluid communication to the extractive distillation zone, and a raffinate conduit provides fluid communication from the extractive distillation zone. A rich solvent conduit provides fluid communication from the extractive distillation zone to the second distillation zone, and an extract conduit provides fluid communication from the second distillation zone. A lean solvent conduit provides fluid communication from the second distillation zone to the lean solvent washing zone, a washing fluid conduit provides fluid communication to the lean solvent washing zone, and a by-product conduit provides fluid communication from the lean solvent washing zone. A clean solvent conduit provides fluid communication from the lean solvent washing zone to at least one of the extractive distillation zone and the second distillation zone.

In an embodiment, the apparatus further comprises a by-product washing zone, the by-product conduit and a second solvent conduit provide fluid communication to the by-product washing zone, and a second by-product conduit and an aqueous solvent conduit provide fluid communication from the by-product washing zone. In a further embodiment, the aqueous solvent conduit provides fluid communication to at least one of the extractive distillation zone and the second distillation zone.

DETAILED DESCRIPTION OF THE INVENTION

Figure 1:
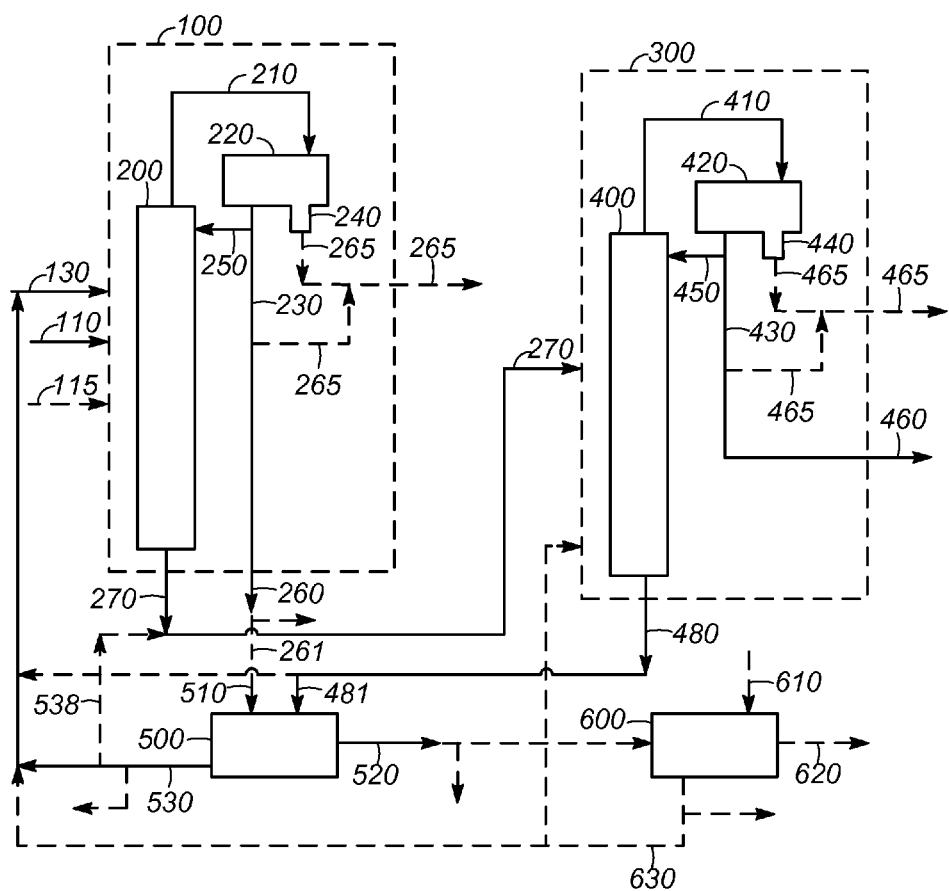
FIG. 1 is a simplified flow scheme illustrating embodiments of the invention.

In general, the invention may be used to remove contaminants from a lean solvent stream in processes that separates at least one desired aromatic hydrocarbon from a feed stream which also includes at least one non-aromatic hydrocarbon. As discussed hereinafter, the contaminant may comprise one or more of an aromatic hydrocarbon, a non-aromatic hydrocarbon, and/or other components such as heating mediums or lubricating oils that boil or have a relative volatility between the desired aromatic and the aromatic selective solvent. The contaminant may be introduced into the aromatic separation process, e.g. in the feed stream and/or the contaminant may be formed within the aromatic separation process, such as via degradation of the aromatic selective solvent. Thus, the contaminant may comprise one or more organic compounds containing various elements, non-limiting examples of which include: oxygen, nitrogen, chlorine, and sulfur. The feed stream may include multiple hydrocarbon species including aromatics and non-aromatic hydrocarbons, such as, paraffins, naphthenes, and olefins. The feed stream may have a wide boiling range and encompass, for example, C6-C20 hydrocarbons, and can include any stream having a sufficiently high concentration of aromatic hydrocarbons to justify removal of aromatics from the feed stream. Usually, a feed stream will contain, by weight, about 15% to about 90% of one or more aromatic hydrocarbons. As an example, the feed stream can include an effluent from a conventional catalytic reforming unit, which may be debutanized or depentanized. Another source for the feed stream can be a liquid by-product from a pyrolysis gasoline unit that may be hydrotreated to substantially saturate olefins and diolefins, and to remove trace levels of sulfur and nitrogen. Typically, the feed stream can include a wide boiling range mixture including benzene, toluene, and xylenes in admixture with corresponding boiling range paraffins and naphthenes As used herein, the term "stream" can be a stream including various hydrocarbon molecules, such as straight-chain, branched, or cyclic alkanes, alkenes, alkadienes, alkynes, and alkenylbenzenes, and optionally other substances or impurities, such as, hydrogen, metals, and sulfur. The stream can also include aromatic and non-aromatic hydrocarbons. Moreover, the hydrocarbon molecules may be abbreviated C1, C2, C3 ... Cn where "n" represents the number of carbon atoms in the hydrocarbon molecule. Such abbreviations followed by a "+" is used to denote that number of carbon atoms or more per molecule, and a "−" is used to denote that number of carbon atoms or less per molecule. As used herein, the term "aromatic" means a hydrocarbon containing one or more rings of unsaturated cyclic carbon radicals where one or more of the carbon radicals can be replaced by one or more non-carbon radicals. An exemplary aromatic compound is benzene having a C6 ring containing three double bonds. Streams may also comprise one or both of water and an aromatic selective solvent.

FIG. 1 is a flow scheme illustrating embodiments of the invention and some of the optional and/or alternate steps and apparatus encompassed by the invention. The feed stream 110 is introduced to an extraction distillation (ED) zone 100 which includes an extractive distillation (ED) column 200. Exemplary ED columns are disclosed in, e.g., U.S. Pat. No. 3,763,037 and U.S. Pat. No. 3,642,614. As used herein, the term "zone" can refer to one or more equipment items and/or one or more sub-zones. Equipment items may include, for example, one or more vessels, heaters, separators, exchangers, conduits, pumps, compressors, and controllers. Additionally, an equipment item can further include one or more zones or sub-zones. A solvent stream 130 is also introduced to ED zone 100. Water, though not required, is usually introduced to ED zone 100 in any convenient manner. For example, water may be introduced by conduit 115 and/or a portion or all of the water may be included in one of the other streams entering ED zone 100 such as solvent stream 130. In the Figure, reference numerals of the streams and the lines or conduits in which they flow are the same.

The solvent can be a compound possessing a five-member ring containing one atom of sulfur and four atoms of carbon with two oxygen atoms bonded to the sulfur atom of the ring. An exemplary solvent is 1,1-dioxide tetrahydrothiofuran or tetrahydrothiophene 1,1-dioxide, which may also be known as tetramethylene sulfone or commonly as, sulfolane. Other compounds, such as, 2-sulfolene, 3-sulfolene, 2-methylsulfolane, 2-4-dimethyl-sulfolane, methyl-2-sulfonylether, an N-aryl-3-sulfonylamine, ethyl-3-sulfonyl sulfide, 2-sulfonylacetate, diethyleneglycol, a polyethyleneglycol, a dipropyleneglycol, a polypropyleneglycol, a dimethylsulfoxide, an N-methylpyrrolidone, a glycol-amine, glycols, glycol ethers including polyethyleneglycolether, an N-methyl-2-pyrrolidone, and an N-formyl morpholine can be used as the solvent. Solvent compounds typically have some polar character and have a greater affinity or selectivity for aromatic hydrocarbons compared to other hydrocarbon species; therefore, the solvent may be referred to as an aromatic selective solvent. Aromatic selective solvent stream 130 can include an effective amount, preferably at least about 90%, by weight, of one or more aromatic selective solvent compounds based on the weight of the aromatic selective solvent stream 130. Water and the aromatic selective solvent are miscible in all proportions. As used herein, the term "aqueous phase" means any mixture which contains more water than aromatic selective solvent on a molar basis. As used herein, the term "aromatic selective solvent phase" means any mixture which contains the same amount or more aromatic selective solvent than water on a molar basis. For example, an aromatic selective solvent phase of a 50/50 molar mixture of sulfolane and water would be nominally 87 wt % sulfolane and 13 wt % water.

Typically, feed stream 110 and aromatic selective solvent stream 130 are contacted and separated in an ED column 200, optionally in the presence of water. As is well known in the art, ED column 200 is operated to produce a light or overhead stream 210 which includes substantially all of the non-aromatic components in the feed stream. The light stream 210 may also comprise water and small amounts of aromatics and aromatic selective solvent. ED column 200 also produces a lower or bottoms stream which includes substantially all of the feed stream aromatic hydrocarbons and substantially all of the aromatic selective solvent introduced into the column. The bottoms stream may also comprise water and non-aromatic components. As used herein, the term "substantially all" means an amount generally of at least 90%, preferably at least 95%, and optimally at least 99%, by weight, of a compound or class of compounds in a stream.

The light stream 210 produced by ED column 200 may be condensed in an overhead system and collected in receiver 220 and a portion returned to the column as reflux 250 while the remainder of the light stream 230 may be withdrawn from the ED zone 100 as raffinate stream 260. When water is present, it may be beneficial to separate water from the light stream to produce a stream comprising water 265 and the raffinate stream 260 comprising the non-aromatic hydrocarbons. For example, a water separation zone may include receiver 220 wherein water may be separated from the light stream in an optional water boot 240 of receiver 220 as is known in the art, and/or water may be separated from the portion of the remainder of the light stream 230 in a separate vessel of a water separation zone, not shown. Thus, if water is separated from a non-aromatic hydrocarbon stream produced by the ED column, this may be considered to be within ED zone 100 and the net light stream comprising non-aromatic hydrocarbons produced by the ED zone 100 may be considered to be raffinate stream 260. The non-aromatic hydrocarbon raffinate stream 260 can include up to 10 wt % aromatics. In an embodiment, the raffinate stream contains less than 1 wt % aromatics and the raffinate stream may contain less than 0.1 wt % aromatics.

The amount of water in the raffinate stream 260 will vary, for example, with the amount of water in the light stream, whether the light stream is separated, the separation conditions including the temperature, the composition of the non-aromatic hydrocarbons, and the amount of water entrained in the raffinate stream. In an embodiment, the raffinate stream 260 comprises less than about 5 wt % water based on the weight of the raffinate stream. In another embodiment, the raffinate stream comprises less than about 1 wt % water, and may comprise less than about 0.05 wt % water based on the weight of the raffinate stream. Water is generally not miscible with the hydrocarbon components such as in streams 210, 230, and 260. At typical operating temperatures, the solubility of water in the non aromatic hydrocarbons is less than 0.05 wt %. However, water may also be present as entrained droplets. If entrained water is not separated from light stream 210, raffinate stream 260 may be a two phase stream. Generally, the quantity of water in the light stream 210 is a function of the column operating conditions and the water level in the circulating solvent.

The ED column 200 will also typically include a reboiler circuit, not shown, wherein heat is supplied to ED column 200 via a portion of the lower stream withdrawn from ED column 200 and the net lower stream effluent leaves ED zone 100 as the rich solvent stream 270. Typical operating conditions of ED column 200 which may have between about 50 to about 90 real trays can include a pressure of about 12 to about 380 kPa, an overhead temperature of about 50° C. to about 170° C., and a bottoms temperature of about 70° C. to about 260° C. In an embodiment with a sulfolane solvent system, the bottoms temperature may be from about 150° C. to about 200° C. Generally, the solvent to feed volume ratio may be about 1:1 to about 20:1 depending on the conditions in the column and the feed composition.

Rich solvent stream 270 comprising the aromatic selective solvent and the aromatic hydrocarbon is separated in a second distillation zone 300 which includes a second distillation column 400. Rich solvent stream 270 may also comprise water, non-aromatic components, and contaminant circulating in the process and/or introduced in the feed stream. Exemplary second distillation columns are disclosed in, e.g., U.S. Pat. No. 3,763,037 and U.S. Pat. No. 3,642,614. As is known in the art, the second distillation zone 300 is operated under conditions to separate the desired aromatic components from the aromatic selective solvent. The operating conditions may include the addition of water, usually in the form of steam, to the second distillation column 400 to improve the separation at a lower bottoms temperature in an effort to minimize degradation of the aromatic selective solvent. Thus, distillation zone 300 may include a steam generation system, which is in communication with second distillation column 400. The second distillation column 400 produces a light or overhead stream 410 that comprises the aromatic hydrocarbon desired to be recovered from the feed stream 110, and optionally water. In an embodiment, the aromatic hydrocarbon is at least one of benzene, toluene, and xylene. The aromatic hydrocarbon may comprise benzene, toluene, and xylene. As is well known in the art, the aromatic separation process may also include a solvent regeneration system, which removes heavy contaminants, i.e. those boiling at a higher temperature than the aromatic selective solvent. As various components of the contaminant circulate in the process, they may combine to form heavy contaminants. By removing contaminants that boil at a lower temperature than the aromatic selective solvent, the opportunity for contaminants to combine should be reduced. Thus, the invention may reduce or eliminate the need to remove heavy contaminants. A solvent regenerator system may be in communication or integrated with second distillation column 300. Thus, in an embodiment, second distillation zone 300 further comprises a solvent regeneration system, not shown.

The light stream 410 produced by second distillation column 400 may be condensed in an overhead system and collected in receiver 420 and a portion returned to the column as reflux 450. The remainder of light stream 430 may be withdrawn from the second distillation zone 300 as extract stream 460 which comprises the desired aromatic hydrocarbon. When water is present, it may be beneficial to separate water from the light stream to produce a stream comprising water 465 and the extract stream 460 comprising the aromatic hydrocarbon. For example, water may be separated from the light stream in an optional water boot 440 of receiver 420 as is known in the art, and/or water may be separated from the portion of the remainder of the light stream 430 in a separate vessel, not shown. Thus, if water is separated from an aromatic hydrocarbon stream produced by the second distillation column, this may be considered to be within second distillation zone 300 and the net light stream comprising aromatic hydrocarbon produced by the second distillation zone 300 may be considered to be extract stream 460.

Second distillation column 400 may be provided with a typical reboiler circuit as was discussed for the ED column to produce a net lower stream effluent that leaves second distillation zone 300 as the lean solvent stream 480, which is normally recycled to ED zone 100. Lean solvent stream 480 may also comprise water. The contaminant comprises one or more components such as aromatic hydrocarbons, non-aromatic hydrocarbons, and/or other components including organic compounds that have a higher boiling point or a lower relative volatility than the light stream 410. Typically, only a small amount of contaminant can be tolerated in the extract stream 460 because of purity specifications for the aromatic hydrocarbon. Therefore, the contaminant will remain and accumulate in the lean solvent stream 480 as it is recycled in the process. As the level of contaminant in the process increases, the aromatic selective solvent becomes less efficient at facilitating the desired separation which causes a loss of the desired aromatic to the raffinate stream, or an accelerated accumulation of contaminant as more non-aromatics remain in the rich solvent stream 270, or both. Without removal, the contaminant will eventually reach a sufficiently high concentration that some will also leave the second distillation zone in extract stream 460 contaminating the desired product.

For example, when the aromatic hydrocarbon in the feed stream comprises benzene and toluene, the contaminant may comprise C8+ aromatics in the feed stream, that is, aromatic hydrocarbons have 8 or more carbon atoms. And when the desired aromatics are C6 through C8 aromatic hydrocarbons, the contaminant may comprise C9+ aromatics in the feed. The contaminant may comprise non-aromatic hydrocarbons that accumulate in the lean solvent recycle stream; and the contaminant may comprise aromatic selective solvent degradation products. Typical operating conditions of second distillation column 400 which may have between about 20 to about 40 real trays can include a pressure of about 100 mmHg (a) to about 110 kPa(g), an overhead temperature of about 50 to about 150° C., and a bottoms temperature of about 80 to about 230° C.

To remove the contaminant from the lean solvent stream 480, at least a portion of lean solvent stream 481 is washed in lean solvent washing zone 500 with a washing stream 510 that comprises one or more non-aromatic hydrocarbons. In an embodiment, the amount of contaminant in the lean solvent stream may be up to about 25 wt % of the lean solvent stream 480. In another embodiment, the amount of contaminant in the lean solvent stream ranges from about 0.5 wt % to about 10 wt % of the lean solvent stream, and may range from about 1 wt % to about 5 wt % of the lean solvent stream. In an embodiment the portion of the lean solvent stream 481 passed to lean solvent washing zone 500 ranges from about 0.1% to about 60% of the lean solvent stream 480. In another embodiment, from about 0.5% to about 20% of the lean solvent stream 480 is washed in lean washing zone 500, and from about 1% to about 5% of the lean solvent stream may be washed in lean washing zone 500. In an embodiment, washing stream 510 comprises a non-aromatic hydrocarbon that is found in feed stream 110. In another embodiment, lean solvent stream 481 may be washed with at least a portion of the raffinate steam, which may be supplied by optional conduit 261. Optionally, washing stream 510 may be a heavy or a light fraction of raffinate stream 260 which may be produced, for example, by distilling or flash separating a portion or all of raffinate stream 260, or by modification of ED zone 100 such as by taking a light side draw from ED column 200. Washing stream 510 may comprise water. In an embodiment, washing steam 510 may comprise components not found in feed stream 110. Washing stream 510 may comprise a nominally pure non-aromatic hydrocarbon component, such as, pentane which can be easily separated from stream 260 in the extraction zone.

Figure 2A:
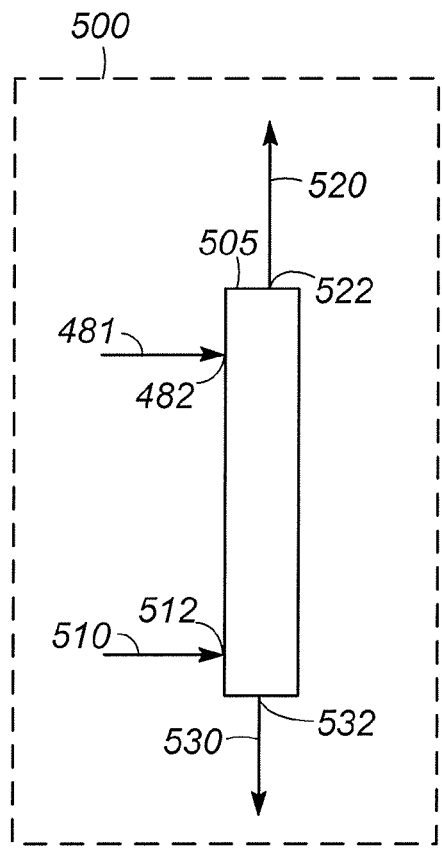
FIGS. 2A and 2B are simplified flow schemes illustrating different embodiments of the lean solvent washing zone of the invention.

The lean solvent washing step comprises thoroughly contacting and separating the lean solvent and non-aromatic hydrocarbon to produce a clean solvent stream 530 and a by-product stream 520. The lean solvent washing step may be conducted in a similar manner and with similar equipment as is used to conduct other liquid-liquid wash and extraction operations. Suitable equipment includes columns with: trays, packing, rotating discs or plates, and static mixers. Pulse columns and mixing/settling tanks may also be used. The lean solvent washing step encompasses single and multi-stage washing processes. In an embodiment the streams are contacted and separated in a multi-stage counter-current column. FIG. 2A illustrates an embodiment of lean solvent washing zone 500 that comprises a counter-current extraction column 505. The non-aromatic hydrocarbon washing stream 510 enters extraction column 505 through washing fluid inlet 512 and lean solvent stream 481 enters extraction column 505 through lean solvent inlet 482. Washing fluid inlet 512 is located below lean solvent inlet 482. The clean solvent passes through clean solvent outlet 532 in a lower portion of extraction column 505 to clean solvent conduit 530. The non-aromatic hydrocarbon phase including the contaminant passes through by-product outlet 522 in an upper portion of extraction column 505 to by-product conduit 520.

Figure 2B:
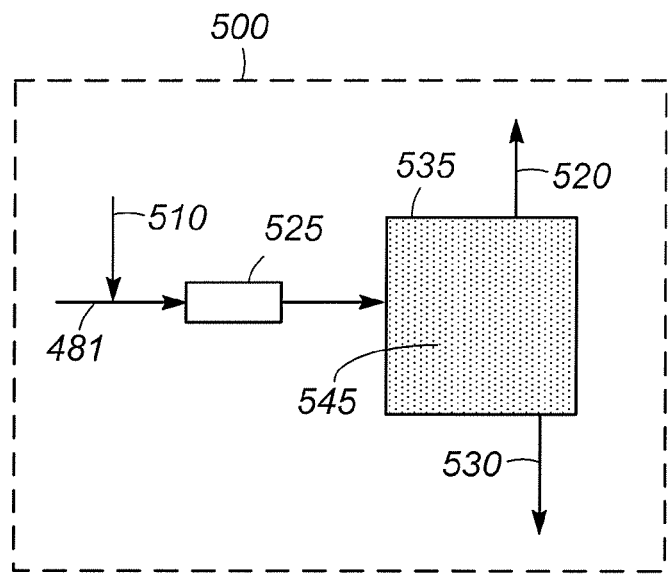

FIG. 2B illustrates an embodiment of lean solvent washing zone 500 that comprises a mixing zone followed by a separation zone. In this embodiment, lean solvent stream 481 and washing stream 510 are introduced into the mixing zone and mixed by introducing washing stream 510 into the flowing lean solvent stream 481 and passing the combined streams through static in-line mixer 525. Static in-line mixers are well known in the art and include a conduit with fixed internals such as baffles, fins, and channels that mix the fluid as it flows through the conduit. In other embodiments lean solvent stream 481 may be introduced into washing stream 510 or the two streams may be combined such as through a "Y" conduit. In another embodiment, lean solvent stream 481 and washing stream 510 are introduced into the static in-line mixer. In other embodiments, the streams may be mixed by any method well know in the art including stirred tank and blending unit operations. The mixed stream comprising lean solvent and non-aromatics is passed through a transfer conduit into a separation zone which comprises separation vessel 535 wherein the two phases are allowed to separate into a clean solvent phase which is withdrawn from a lower portion of separation vessel 535 via clean solvent conduit 530 and the non-aromatic phase comprising a portion of the contaminant from lean solvent stream 481 which is withdrawn from an upper portion of separation vessel 535 via by-product conduit 520. Separation vessel 535 may contain a solid media 545 which facilitates the phase separation. In other embodiments the separation zone may comprise multiple vessels which may be arranged in series, parallel, or a combination of the two. The separation vessels may be of any shape and configuration to facilitate the separation, collection, and removal of the two phases. In a further embodiment, lean solvent washing zone 500 may include a single vessel wherein lean solvent stream 481 and washing stream 510 are mixed, then remain in the vessel to settle into the two product phases. In an embodiment the process comprises at least two stages of counter-current mixing and settling, i.e. separation.

The non-aromatic hydrocarbon in washing stream 510 extracts the contaminant from the lean solvent stream to produce a clean solvent stream 530 having a lower concentration of contaminant than the concentration of contaminant in the lean solvent stream 481. This enables, recycle of a portion of or the entire clean solvent stream 530 directly to ED zone 100 without the need to separate other components such as washing stream components from the clean aromatic selective solvent before it can be recycled. In an embodiment, clean solvent stream 530 is an aromatic selective solvent phase comprising at least as much aromatic selective solvent as water on a molar basis. In another embodiment, clean solvent stream 530 comprises at least 87 wt % aromatic selective solvent and less than 6 wt % water, optionally clean solvent stream 530 may comprise at least 87 wt % aromatic selective solvent and less than 3 wt % water. The lean solvent washing zone 500 also produces a by-product stream 520 comprising the contaminant, the washing stream non-aromatic hydrocarbon, and small amounts of the aromatic selective solvent.

The amount of contaminant removed from lean solvent stream 481 may vary with a number of factors including: the amount of contaminant in lean solvent stream 480, the desired equilibrium concentration of contaminant in the circulating aromatic selective solvent, the ratio of lean solvent streams 480 and 481, and the rate at which contaminant is being added to the process and generated within the process. In an embodiment, lean solvent washing zone 500 removes from about 10% to about 99% of the contaminant from lean solvent stream 481. That is, by-product stream 520 comprises from about 10% to about 99% of the contaminant in lean solvent stream 481. In another embodiment, lean solvent washing zone 500 removes from about 50% to about 95% of the contaminant from lean solvent stream 481; and may remove from about 80% to about 90% of the contaminant from lean solvent stream 481. The lean solvent washing zone 500 may remove at least about 75% of the contaminant from lean solvent stream 481. In an embodiment, where the contaminant comprises C9+ aromatics, by-product stream 520 may comprise up to about 40 wt % C9+ aromatics. In another embodiment, by-product stream 520 may comprise between about 0.1 wt % and about 15 wt % C9+ aromatics; optionally between about 5 wt % and about 10 wt % C9+ aromatics. In an embodiment, the lean solvent washing step operates in the absence of an aqueous phase. In another embodiment, the lean solvent washing step operates in the absence of water. The lean solvent washing zone 500 may operate at conditions including: a temperature ranging from about 10° C. to about 95° C., optionally, from about 25° C. to about 80° C. and a non-aromatic hydrocarbon to lean solvent weight ratio ranging from about from 0.02 to about 10; optionally, from about 0.05 to about 1.

At least a portion, of clean solvent stream 530 is passed to at least one of ED zone 100 and second distillation zone 300. In the embodiment of FIG. 1, at least a portion of clean solvent stream 530 is combined with solvent stream 130 and introduced into ED zone 100. Clean solvent stream 530 may be introduced as a separate stream into ED zone 100 and may be combined with other steams passing to ED zone 100, including feed stream 110 and optional water stream 115. In an embodiment substantially all of clean solvent stream 530 is passed to the ED zone 100 to contact feed stream 110. As illustrated by optional conduit 538 in FIG. 1, a portion of clean solvent stream 530 may be introduced into second distillation zone 300 in combination with rich solvent stream 270. The clean solvent may be introduced as a separate stream and/or combined with other streams that are introduced into second distillation zone 300. The clean solvent may be introduced to the second distillation column 400 or other portions of second zone 300, not shown, such as the solvent regeneration system and steam generation system. All or a portion of clean solvent stream may be passed to either the second distillation zone 300, the ED zone 100 or both of the second distillation zone 300 and the ED zone 100 in any proportion.

By-product stream 520 may be sent to other process units for further processing in a similar manner as is known for raffinate stream 260. Optionally, at least a portion of by-product stream 520 may be washed in by-product washing zone 600 with a second solvent stream 610 that comprises water to recover minor amounts of aromatic selective solvent from by-product stream 520. In an embodiment, the amount of aromatic selective solvent in by-product stream 520 may be up to about 5 wt % of the by-product stream. In another embodiment, the by-product stream may comprise from about 0.1 wt % to about 3 wt % of the aromatic selective solvent, and may comprise from about 0.5 wt % to about 2 wt % of the aromatic selective solvent. In an embodiment, at least a portion of at least one of the first water stream 265 and the second water stream 465 provides at least a portion of the second solvent 610 in the by-product washing zone 600. Water for the second solvent stream 610 may be derived from any convenient source including other process water streams such as makeup water which may be added to second distillation zone 300.

The by-product washing step may be conducted in a similar manner and with similar equipment as discussed and illustrated above for the lean solvent washing step. The two washing steps may use the same or different equipment to conduct the mixing and separating of the streams introduced to the respective washing zones. The second solvent stream 610 extracts the aromatic selective solvent from at least a portion of by-product stream 520 to produce aqueous solvent stream 630 comprising more water and than aromatic selective solvent on a molar basis. In an embodiment, all or a portion of the aqueous solvent stream 630 may be recycled to at least one of the ED zone 100 and the second distillation zone 300 to provide at least a portion of the water and solvent which are used therein. The optional aqueous solvent recycle stream or streams may be introduced individually or combined with one of the other streams that are passed to the ED zone 100 and the second distillation zone 300.

The by-product washing zone 600 also produces a second by-product stream 620 having a lower concentration of aromatic selective solvent than the concentration of aromatic selective solvent in the by-product stream 520. In an embodiment, at least about 90% of the aromatic selective solvent is removed from the by-product stream 520 in by-product washing zone 600. That is, aqueous solvent stream 630 comprises at least about 90% of the aromatic selective solvent in by-product stream 520 being washed in by-product washing zone 600. In another embodiment, at least about 98% of the aromatic selective solvent is removed from the by-product stream 520, and optionally more than 99% of the aromatic selective solvent may be removed from the by-product stream 520 in by-product washing zone 600. The by-product washing zone 600 may operate at conditions including a temperature ranging from about 10° C. to about 95° C., optionally from about 25° C. to about 80° C. and a pressure sufficient to ensure a liquid phase. The operating conditions may also include a second solvent stream 610 to first by-product stream 520 weight ratio ranging from about 0.01 to about 10. In an embodiment, the second solvent stream to first by-product stream weight ratio ranges from about 0.1 to about 5; optionally, the second solvent stream to first by-product stream weight ratio ranges about 0.5 to about 1.

Those of ordinary skill in the art will understand that the process flow and connections of various zones described herein is sufficient to practice the invention. Unless otherwise stated, the exact connection point within the zones is not essential to the invention. For example, it is well known in the art that a stream to a distillation zone may be sent directly to the column, or the stream may first be sent to other equipment within the zone such as heat exchangers, to adjust temperature, and/or pumps to adjust the pressure. Likewise, streams leaving a zone may pass directly from a distillation column or they may first pass through an overhead or reboiler section before leaving the distillation zone.

EXAMPLE

This example is presented to further illustrate some aspects and benefits of the invention. The embodiments presented are not to be considered as limiting the scope of the invention. A computer simulation is performed using models that are developed and tested against laboratory washing, extraction, and separation procedures. To obtain a comparison against the prior art, this example assumes the lean solvent stream to be treated for contaminant removal in the lean solvent washing zone is the same as that defined in the Example which spans columns 10 and 11 of U.S. Pat. No. 3,642,614 ('614 Example). Although U.S. Pat. No. 3,642,614 includes additional process steps or unit operations such a liquid-liquid extractor and a liquid-liquid raffinate water wash column, these do not affect the comparison. A comparison of the lean washing step of the invention, using a counter-current extraction column as illustrated and described in FIG. 2A, to the contaminant (C9+ aromatics) removal in the water wash tower of the '614 Example is given below in Table 1.

As illustrated in the embodiment of this example, the invention, while encompassing, does not require the presence of significant quantities of water in the lean solvent washing step. As shown in Table 1, the invention is able to achieve the same reduction of C9+ aromatic contaminant removal from the lean solvent stream as was obtained in the '614 Example without any additional water and using less than 30% of the non-aromatics as used in the '614. Before the clean solvent in the '614 Example is recycled, it is first heated to remove the added water—an operation that costs approximately $500,000 per year based on 17,000 Btu/lb-mol water vaporized, 8000 hr/year, and $10 per/million Btu. In contrast, the clean solvent of the present invention may be recycled directly to the ED zone where only the non-aromatics would need to be vaporized. Water, solvent and C9+ would only require sensible heat and the total heat required for reprocessing would be negligible in comparison. The aromatic content of the non-aromatic stream to the lean solvent wash zone was set for the invention example in an effort to mimic that of the '614 Example on a relative basis to the amount of non-aromatics. The actual concentration of aromatics in the raffinate stream from an ED zone is expected to be lower than the concentration used in the invention example.

TABLE 1

|  | '614 Example | Invention Example |
|---|---|---|
| Lean solvent stream to the lean solvent wash zone | | |
| lb moles/hr water | 5.19 | 5.19 |
| lb moles/hr C9+ aromatics | 0.83 | 0.83 |
| lb moles/hr sulfolane | 153.98 | 153.98 |
| Wash water to lean solvent wash zone | | |
| lb moles/hr of wash water | 342.43 | 0 |
| Non-aromatic stream to the lean solvent wash zone | | |
| lb moles/hr of aromatic hydrocarbons | 2.05 | 0.60 |
| lb moles/hr of sulfolane | 0.67 | <1 ppm |
| lb moles/hr of non-aromatic hydrocarbons | 91.31 | 25.91 |
| Clean Solvent stream from the lean solvent wash zone | | |
| lb moles/hr of sulfolane | 154.65 | 153.87 |
| lb moles/hr of wash water | 347.62 | 5.19 |
| lb moles/hr aromatic hydrocarbons | Trace | 0.57 |
| lb moles/hr C9+ aromatics | 0.07 | 0.07 |
| lb moles/hr of non-aromatic hydrocarbons | Trace | 2.36 |
| By-product stream from the lean solvent wash zone | | |
| lb moles/hr sulfolane | 13 ppm | 0.11 |
| lb moles/hr of wash water | 0 | <0.01 |
| lb moles/hr aromatic hydrocarbons | 2.05 | 0.03 |
| lb moles/hr C9+ aromatics | 0.76 | 0.76 |
| lb moles/hr of non-aromatic hydrocarbons | 91.31 | 23.55 |

Although the by-product stream may be used as is from lean solvent washing step of the present invention, an economical by-product washing step can easily recover the small amount of aromatic selective solvent that remains. In this example, only 16.5 lb moles/hr of water are needed to recover substantially all of the 0.11 lb moles/hr of sulfolane in the by-product stream. Thus, the aqueous phase effluent stream comprising 16.5 lb moles/hr of water and 0.11 lb moles/hr of sulfolane is readily recycled in the process and the second by-product stream comprises 23.55 lb moles/hr of non-aromatic hydrocarbons, 0.76 lb moles/hr C9+ aromatics, and about 13 wt-ppm of sulfolane. Therefore, the invention may provide two additional benefits. First, if it is necessary to remove the C9+ aromatics from the non-aromatics it will be more cost effective to do so in the present invention because the C9+ aromatics are more concentrated in a smaller volume stream. Second, the present invention example also decreases the solvent loss by almost 70% over the '614 Example. The concentration of sulfolane in both cases is 13 ppm, but present example only uses about 30% of the non-aromatics as that used in '614 Example and the remaining net raffinate stream 265 from the present invention's ED zone contains less than 1 wt-ppm sulfolane.

The invention claimed is:

1. An apparatus for removing a contaminant from a solvent separation process comprising:
    (a) an extractive distillation zone;
    (b) a feed conduit providing fluid communication to the extractive distillation zone;
    (c) a solvent conduit providing fluid communication to the extractive distillation zone c) a solvent conduit providing fluid communication to the extractive distillation zone;
    (d) a raffinate conduit providing fluid communication from the extractive distillation zone;
    (e) a rich solvent conduit providing fluid communication from the extractive distillation zone to a second distillation zone;
    (f) an extract conduit providing fluid communication from the second distillation zone;
    (g) a lean solvent conduit providing fluid communication from the second distillation zone to a lean solvent washing zone;
    (h) a washing fluid conduit providing fluid communication to the lean solvent washing zone;
    (i) a clean solvent conduit providing fluid communication from the lean solvent washing zone to the extractive distillation zone;
    (j) a by-product conduit providing fluid communication from the lean solvent washing zone to a by-product washing zone;
    (k) a second solvent conduit providing fluid communication to the by-product washing zone;
    (l) a second by-product conduit providing fluid communication from the by-product washing zone;
    (m) an aqueous solvent conduit providing fluid communication from the by-product washing zone; and
    wherein the aqueous solvent conduit provides fluid communication to the extractive distillation zone.

* * * * *